United States Patent
Catherwood et al.

(10) Patent No.: US 6,601,160 B2
(45) Date of Patent: Jul. 29, 2003

(54) DYNAMICALLY RECONFIGURABLE DATA SPACE

(75) Inventors: Michael Catherwood, Pepperell, MA (US); Joseph W. Triece, Phoenix, AZ (US); Michael Pyska, Phoenix, AZ (US); Joshua M. Conner, Apache Junction, AZ (US)

(73) Assignee: Microchip Technology Incorporated, Chandler, AZ (US)

( * ) Notice: Subject to any disclaimer, the term of this patent is extended or adjusted under 35 U.S.C. 154(b) by 224 days.

(21) Appl. No.: 09/870,448

(22) Filed: Jun. 1, 2001

(65) Prior Publication Data

US 2003/0028743 A1 Feb. 6, 2003

(51) Int. Cl.[7] .............................................. G06F 15/76
(52) U.S. Cl. ....................................... 712/225; 711/217
(58) Field of Search ............................... 711/217, 200; 712/220, 225

(56) References Cited

U.S. PATENT DOCUMENTS

| | | | |
|---|---|---|---|
| 3,781,810 A | 12/1973 | Downing | 712/228 |
| 4,398,244 A | 8/1983 | Chu et al. | 712/244 |
| 4,472,788 A | 9/1984 | Yamazaki | 708/209 |
| 4,481,576 A | 11/1984 | Bicknell | 711/217 |
| 4,488,252 A | 12/1984 | Vassar | 708/505 |
| 4,511,990 A | 4/1985 | Hagiwara et al. | 708/501 |
| 4,556,938 A | 12/1985 | Parker et al. | 712/241 |
| 4,626,988 A | 12/1986 | George | 712/241 |
| 4,730,248 A | 3/1988 | Watanabe et al. | 712/228 |
| 4,782,457 A | 11/1988 | Cline | 708/205 |
| 4,807,172 A | 2/1989 | Nukiyama | 708/209 |
| 4,829,420 A | 5/1989 | Stahle | 711/200 |
| 4,829,460 A | 5/1989 | Ito | 708/209 |
| 4,839,846 A | 6/1989 | Hirose et al. | 708/497 |
| 4,872,128 A | 10/1989 | Shimizu | 708/209 |
| 4,882,701 A | 11/1989 | Ishii | 712/241 |
| 4,941,120 A | 7/1990 | Brown et al. | 708/497 |
| 4,943,940 A | 7/1990 | New | 708/507 |
| 4,959,776 A | 9/1990 | Deerfield et al. | 711/217 |
| 4,977,533 A | 12/1990 | Miyabayashi et al. | 708/404 |
| 4,984,213 A | 1/1991 | Abdoo et al. | 365/230.03 |
| 5,007,020 A | 4/1991 | Inskeep | 711/200 |
| 5,012,441 A | 4/1991 | Retter | 711/217 |
| 5,032,986 A | 7/1991 | Pathak et al. | 711/217 |
| 5,038,310 A | 8/1991 | Akagiri et al. | 708/205 |
| 5,056,004 A | 10/1991 | Ohde et al. | 712/241 |
| 5,099,445 A | 3/1992 | Studor et al. | 708/209 |
| 5,101,484 A | 3/1992 | Kohn | 712/241 |
| 5,117,498 A | 5/1992 | Miller et al. | 712/241 |
| 5,122,981 A | 6/1992 | Taniguchi | 708/497 |
| 5,155,823 A | 10/1992 | Tsue | 711/217 |

(List continued on next page.)

OTHER PUBLICATIONS

Martin D et al: "a RSIC architecture with uncompromised digital signal processing and microcontroller operation" Acoustics, Speech and Signal Processing, 1998. Proceedings of the 1998 IEEE International Conference on Seattle, WA, ISA May 12–15 1998, New Yor, NY.

George A.D.: DSP96002 vs i860: Digital Signal Processing Applications: IEEE, Aug. 1992, pp. 110–114.

Kloker K L et al: "The Motorola DSP 96002 IEEE floating–point digital signal processor" IEEE, 1989, pp. 2480–2483.

Primary Examiner—David L. Robertson
(74) Attorney, Agent, or Firm—Swidler Berlin Shereff Friedman, LLP

(57) ABSTRACT

A processor is provided that has a data memory that may be addressed as a dual memory space in one mode and as a single linear memory space in another mode. The memory may permit dual concurrent operand fetches from the data memory when DSP instructions are processed. The memory may then dynamically permit the same memory to be accessed as a single linear memory address space for non-DSP instructions.

15 Claims, 6 Drawing Sheets

U.S. PATENT DOCUMENTS

| | | | | |
|---|---|---|---|---|
| 5,197,023 | A | 3/1993 | Nakayama | 708/505 |
| 5,197,140 | A | 3/1993 | Balmer | 711/220 |
| 5,206,940 | A | 4/1993 | Murakami et al. | 711/218 |
| 5,212,662 | A | 5/1993 | Cocanougher et al. | 708/508 |
| 5,276,634 | A | 1/1994 | Suzuki et al. | 708/497 |
| 5,282,153 | A | 1/1994 | Bartkowiak et al. | 708/233 |
| 5,327,543 | A | 7/1994 | Miura et al. | 712/224 |
| 5,327,566 | A | 7/1994 | Forsyth | 710/260 |
| 5,379,240 | A | 1/1995 | Byrne | 708/209 |
| 5,448,703 | A | 9/1995 | Amini et al. | 710/110 |
| 5,448,706 | A | 9/1995 | Fleming et al. | 711/217 |
| 5,463,749 | A | 10/1995 | Wertheizer et al. | 711/110 |
| 5,469,377 | A | 11/1995 | Amano | 708/497 |
| 5,471,600 | A | 11/1995 | Nakamoto | 711/5 |
| 5,497,340 | A | 3/1996 | Uramoto et al. | 708/552 |
| 5,499,380 | A | 3/1996 | Iwata et al. | 711/212 |
| 5,548,544 | A | 8/1996 | Matheny et al. | 708/497 |
| 5,568,412 | A | 10/1996 | Han et al. | 708/497 |
| 5,596,760 | A | 1/1997 | Ueda | 712/241 |
| 5,600,813 | A | 2/1997 | Nakagawa et al. | 711/217 |
| 5,619,711 | A | 4/1997 | Anderson | 712/221 |
| 5,642,516 | A | 6/1997 | Hedayat et al. | 710/260 |
| 5,689,693 | A | 11/1997 | White | 712/224 |
| 5,694,350 | A | 12/1997 | Wolrich et al. | 708/497 |
| 5,696,711 | A | 12/1997 | Makineni | 708/497 |
| 5,706,460 | A | 1/1998 | Craig et al. | 712/204 |
| 5,715,470 | A | 2/1998 | Asano et al. | 375/341 |
| 5,737,570 | A | 4/1998 | Koch | 711/149 |
| 5,740,419 | A | 4/1998 | Potter | 712/241 |
| 5,748,516 | A | 5/1998 | Goddard et al. | 708/497 |
| 5,764,555 | A | 6/1998 | McPherson et al. | 708/497 |
| 5,774,711 | A | 6/1998 | Henry et al. | 712/244 |
| 5,778,416 | A | 7/1998 | Harrison et al. | 711/5 |
| 5,790,443 | A | 8/1998 | Shen et al. | 708/491 |
| 5,808,926 | A | 9/1998 | Gorshtein et al. | 708/505 |
| 5,812,439 | A | 9/1998 | Hansen | 708/497 |
| 5,825,730 | A | 10/1998 | Nishida et al. | 369/44.32 |
| 5,826,096 | A | 10/1998 | Baxter | 712/24 |
| 5,828,875 | A | 10/1998 | Halvarsson et al. | 712/241 |
| 5,832,257 | A | 11/1998 | Touriguian et al. | 712/220 |
| 5,862,065 | A | 1/1999 | Muthusamy | 708/521 |
| 5,880,984 | A | 3/1999 | Burchfiel et al. | 708/501 |
| 5,892,697 | A | 4/1999 | Brakefield | 708/496 |
| 5,892,699 | A | 4/1999 | Duncan et al. | 708/628 |
| 5,894,428 | A | 4/1999 | Harada | 708/306 |
| 5,909,385 | A | 6/1999 | Nishiyama et al. | 708/630 |
| 5,917,741 | A | 6/1999 | Ng | 708/497 |
| 5,930,159 | A | 7/1999 | Wong | 708/550 |
| 5,930,503 | A | 7/1999 | Drees | 713/1 |
| 5,938,759 | A | 8/1999 | Kamijo | 712/209 |
| 5,941,940 | A | 8/1999 | Prasad et al. | 708/523 |
| 5,943,249 | A | 8/1999 | Handlogten | 708/496 |
| 5,951,627 | A | 9/1999 | Kiamilev et al. | 708/404 |
| 5,951,679 | A | 9/1999 | Anderson et al. | 712/241 |
| 5,991,787 | A | 11/1999 | Abel et al. | 708/400 |
| 5,996,067 | A | 11/1999 | White | 712/224 |
| 6,009,454 | A | 12/1999 | Dummermuth | 709/108 |
| 6,014,723 | A | 1/2000 | Tremblay et al. | 711/1 |
| 6,026,489 | A | 2/2000 | Wachi et al. | 712/241 |
| 6,044,392 | A | 3/2000 | Anderson et al. | 708/551 |
| 6,044,434 | A | 3/2000 | Oliver | 711/110 |
| 6,058,409 | A | 5/2000 | Kozaki et al. | 708/409 |
| 6,058,410 | A | 5/2000 | Sharangpani | 708/551 |
| 6,058,464 | A | 5/2000 | Taylor | 711/217 |
| 6,061,780 | A | 5/2000 | Shippey et al. | 712/204 |
| 6,076,154 | A | 6/2000 | Van Eijndhoven et al. | 712/24 |
| 6,101,521 | A | 8/2000 | Kosiec | 708/550 |
| 6,115,732 | A | 9/2000 | Oberman et al. | 708/625 |
| 6,128,728 | A | 10/2000 | Dowling | 712/228 |
| 6,134,574 | A | 10/2000 | Oberman et al. | 708/551 |
| 6,145,049 | A | 11/2000 | Wong | 710/267 |
| 6,434,690 | B1 * | 8/2002 | Ohsuga et al. | 712/35 |

\* cited by examiner

NON DSP ENGINE INSTRUCTIONS

DSP ENGINE OPERATIONS

DYNAMICALLY RECONFIGURABLE DATA SPACE

FIELD OF THE INVENTION

The present invention relates to systems and methods for addressing memory locations and, more particularly, to systems and methods for dynamically accessing a memory as a linear memory space and as a dual memory space.

BACKGROUND OF THE INVENTION

Digital Signal Processors (DSPs) conventionally are structured to perform mathematical calculations very quickly. The calculations may include repetitive operations such as multiply and accumulate operations that are performed on a series of constant or calculated data stored in a memory. For optimum performance, DSPs must be able to repetitively fetch two operands for immediate processing, calculate a result and write the result back within one processor cycle. In pipelined implementations, result write back should occur at the end of each processor cycle once the pipeline is full.

To allow DSPs to show significant performance improvement over conventional processors for the above types of operations, DSPs typically have the ability to perform dual concurrent operand fetches from a relatively large data memory. Conventional micro-controllers and microprocessors typically allow dual concurrent operand fetches only from a limited number registers, which is overly restrictive for DSPs. This is because processor cycles must be devoted to loading registers with operand data as an intermediate step prior to processing the data, rather than fetching the operand data directly from the memory in the case of a DSP.

Conventional DSPs typically include two data memories, an X memory and a Y memory. They further include X and Y data buses coupled respectively to the X and Y memories. The X and Y memories are separately addressed and allow the DSP to perform dual, concurrent operand fetching and processing directly from the memories—one operand being fetched from the X memory and the other from the Y memory.

Providing separate X and Y memories with separate busing structures allows conventional DSPs to efficiently execute instructions on two operands. However, for instructions that do not require two operands, as is the case for typical micro controller unit (MCU) or non-DSP instructions, separate X and Y memories may be a disadvantage. This is because operands may be stored in either the X or the Y memory. Accordingly, programmers must keep track of which memory the operand data is stored in to retrieve the proper data.

Accordingly, there is a need for a more efficient memory organization for digital signal processing which permits good MCU or non-DSP instruction support. There is a further need for a memory organization that provides dual concurrent operand fetching for DSP class instructions but which allows access to all memory locations when single operands are required without requiring software overhead to track whether the operand is in the X or Y memory and without requiring separate read instructions.

SUMMARY OF THE INVENTION

According to the present invention, a processor is provided that has a data memory that may be addressed as a dual memory space in one mode and as a single linear memory space in another mode. The memory may permit dual concurrent operand fetches from the data memory when DSP instructions are processed. The memory may then dynamically permit the same memory to be accessed as a single linear memory address space for non-DSP instructions.

According to an embodiment of the invention, the method provides linear and dual address spaces within a memory. The method includes providing a digital signal processor (DSP) engine, an arithmetic logic unit (ALU) and a memory. The method further includes providing separate X and Y address generation units for generating addresses to the memory. The X address generation unit may be configured to generate addresses to all of the memory space when processing a non-digital signal processor (DSP) engine instruction and to a first portion of the memory when processing a DSP engine instruction. The Y address generation unit may be configured to generate addresses to a second portion of the memory space when processing a DSP engine instruction and to none of the memory space when processing a non-digital signal processor (DSP) engine instruction. The method may further include providing an instruction decoder that decodes instructions and, in response, activates the X address generation unit for ALU instructions and activates the X and Y address generation units for DSP engine instructions. The first and second memory portions may be overlapping or non-overlapping. The first and second portion memory portions may further be contiguous or not contiguous with respect to each other. In addition, the first portion may include a portion above the second portion and a portion below the second portion.

According to another embodiment, the method may further include providing separate X and Y data buses. In this configuration, the X data bus may be coupled to the memory permitting reading and writing to and from the entire memory and the Y data bus may be coupled to the second portion of the memory permitting reading and also writing in some embodiments from the second portion. The method may further include reading X and Y operands concurrently from the respective first and second portions of the memory over the X and Y data buses based on the instruction decoder decoding a DSP instruction requiring a dual operand fetch.

According to another embodiment of the invention, a processor addresses a memory as a single and dual space memory based on an addressing mode. The processor includes a data memory, an instruction decoder and X and Y address generators. The data memory has X and Y memory spaces. The instruction decoder determines whether an instruction requires single or dual memory space operation and selectively activates the X and Y address generators. The instruction decoder activates the X and Y address generators based on the instruction decoder determining dual memory space operation is required. Alternatively, the instruction decoder activates the X address generator only based on the instruction decoder determining single memory space operation is required.

The processor may further include registers coupled to the X and Y address generators for storing pointers to the memory. For a dual memory space operation, a subset of the registers stores pointers to the Y space within the memory and a subset of the registers stores pointers to the X space within the memory. For a single memory space operation, any of the registers stores pointers to the memory.

The processor may further include X and Y data buses coupled to the memory for retrieving operands from the X and Y memory spaces in a dual memory space operation and for retrieving operands from the memory over the X data bus in a single memory space operation. The processor may further include a DSP engine having operand inputs coupled to the X and Y data buses and having a result output coupled only to the X data bus. The processor may still further include an arithmetic logic unit (ALU) coupled to the X data buses for operand and result input and output.

BRIEF DESCRIPTION OF THE FIGURES

The above described features and advantages of the present invention will be more fully appreciated with reference to the detailed description and appended figures in which.

DETAILED DESCRIPTION

According to the present invention, a processor is provided that has a data memory that may be addressed as a dual memory space in one mode and as a single linear memory space in another mode. The memory may permit dual concurrent operand fetches from the data memory when DSP instructions are processed. The memory may then dynamically permit the same memory to be accessed as a single linear memory address space for non-DSP instructions.

Figure 1:
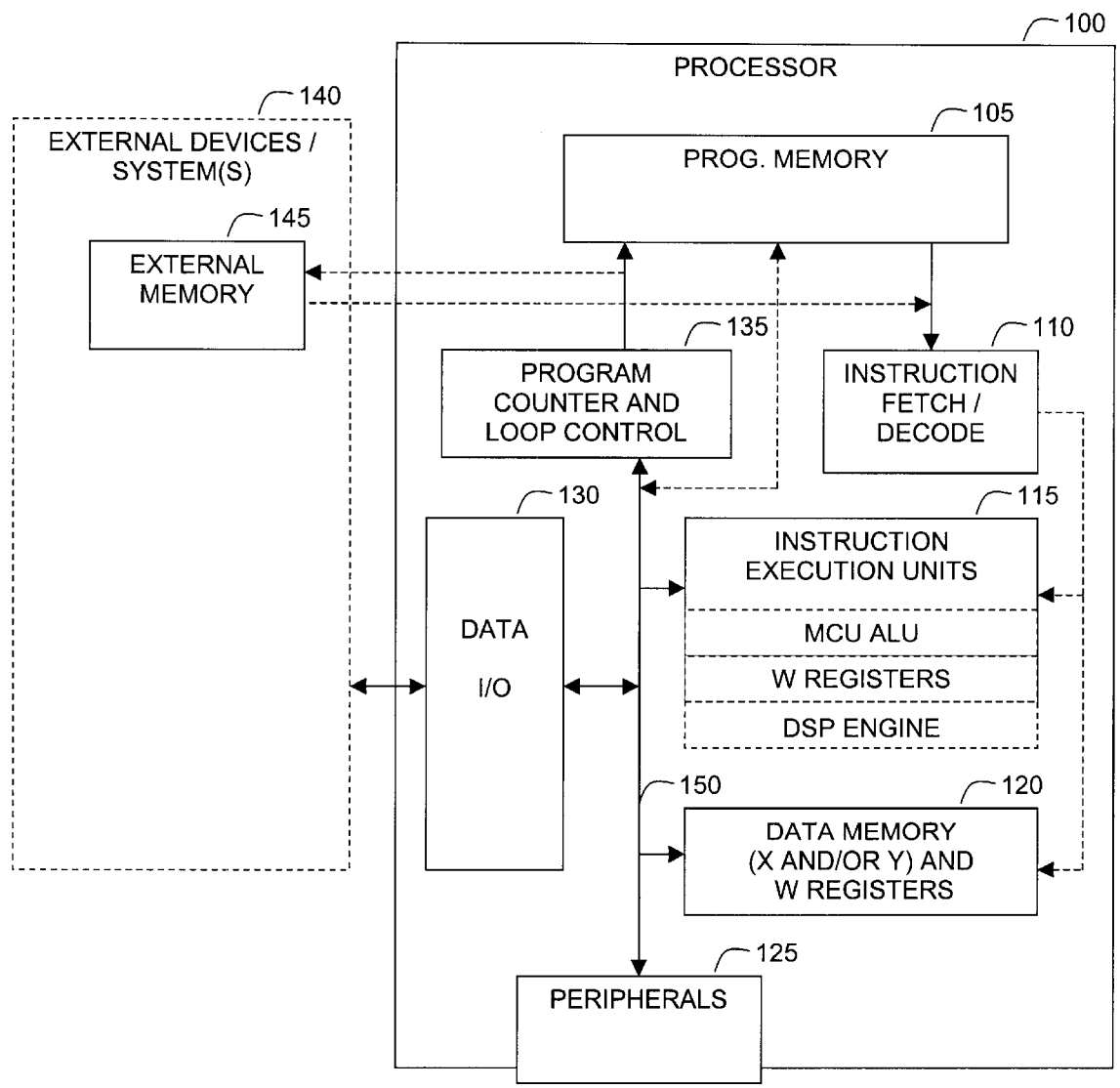
FIG. 1 depicts a functional block diagram of an embodiment of a processor chip within which embodiments of the present invention may find application.
Figure 2:
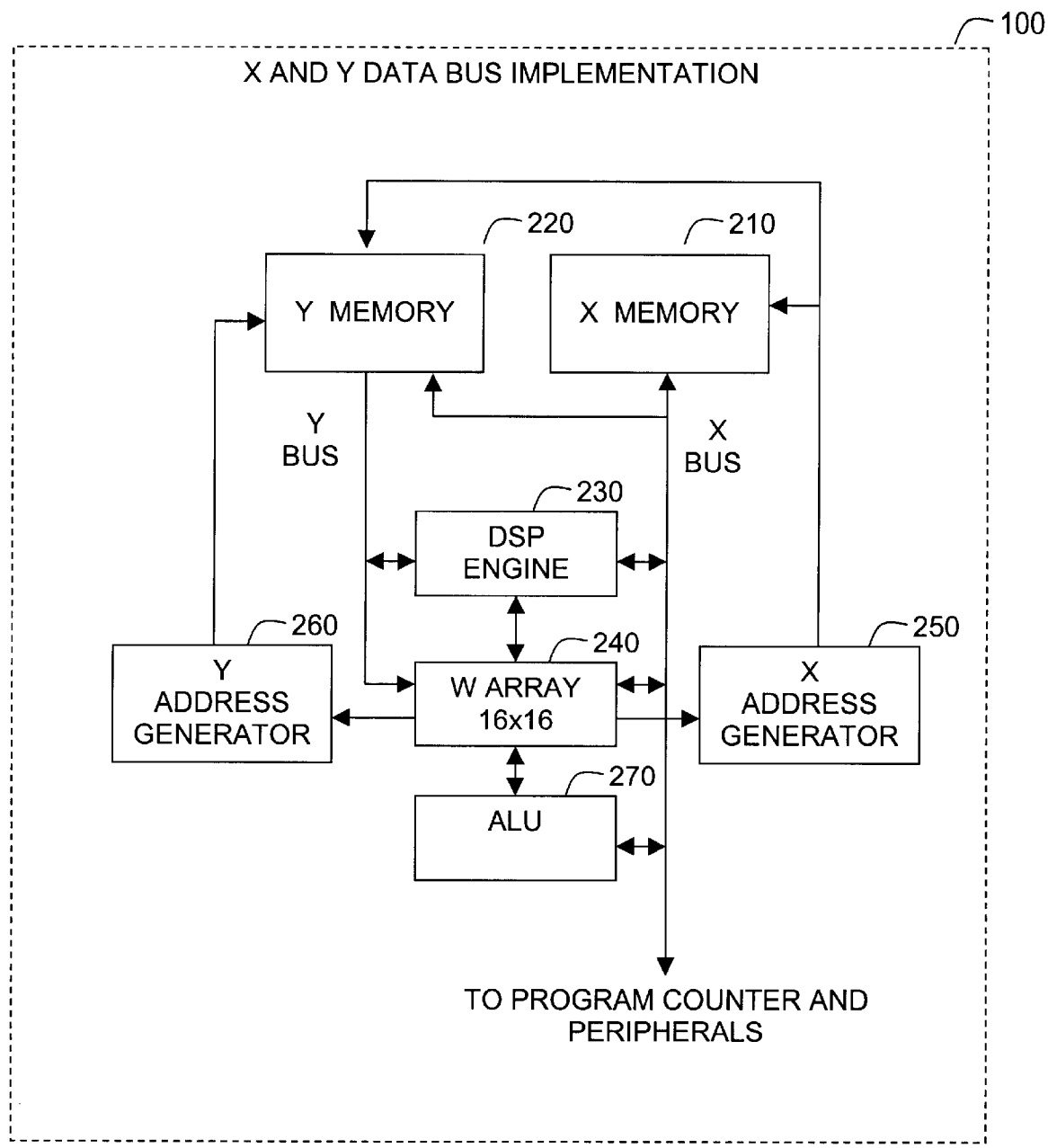
FIG. 2 depicts a functional block diagram of a data busing scheme for use in a processor, which has a microcontroller and a digital signal processing engine, within which embodiments of the present invention may find application.

In order to describe embodiments of processing instructions in word and/or byte modes, an overview of pertinent processor elements is first presented with reference to FIGS. 1 and 2. The systems and methods for implementing word and/or byte mode processing are then described more particularly with reference to FIGS. 3–5.

Overview of Processor Elements

FIG. 1 depicts a functional block diagram of an embodiment of a processor chip within which the present invention may find application. Referring to FIG. 1, a processor 100 is coupled to external devices/systems 140. The processor 100 may be any type of processor including, for example, a digital signal processor (DSP), a microprocessor, a microcontroller or combinations thereof. The external devices 140 may be any type of systems or devices including input/output devices such as keyboards, displays, speakers, microphones, memory, or other systems which may or may not include processors. Moreover, the processor 100 and the external devices 140 may together comprise a stand alone system.

The processor 100 includes a program memory 105, an instruction fetch/decode unit 110, instruction execution units 115, data memory and registers 120, peripherals 125, data I/O 130, and a program counter and loop control unit 135. The bus 150, which may include one or more common buses, communicates data between the units as shown.

The program memory 105 stores software embodied in program instructions for execution by the processor 100. The program memory 105 may comprise any type of nonvolatile memory such as a read only memory (ROM), a programmable read only memory (PROM), an electrically programmable or an electrically programmable and erasable read only memory (EPROM or EEPROM) or flash memory. In addition, the program memory 105 may be supplemented with external nonvolatile memory 145 as shown to increase the complexity of software available to the processor 100. Alternatively, the program memory may be volatile memory which receives program instructions from, for example, an external non-volatile memory 145. When the program memory 105 is nonvolatile memory, the program memory may be programmed at the time of manufacturing the processor 100 or prior to or during implementation of the processor 100 within a system. In the latter scenario, the processor 100 may be programmed through a process called in-line serial programming.

The instruction fetch/decode unit 110 is coupled to the program memory 105, the instruction execution units 115 and the data memory 120. Coupled to the program memory 105 and the bus 150 is the program counter and loop control unit 135. The instruction fetch/decode unit 110 fetches the instructions from the program memory 105 specified by the address value contained in the program counter 135. The instruction fetch/decode unit 110 then decodes the fetched instructions and sends the decoded instructions to the appropriate execution unit 115. The instruction fetch/decode unit 110 may also send operand information including addresses of data to the data memory 120 and to functional elements that access the registers.

The program counter and loop control unit 135 includes a program counter register (not shown) which stores an address of the next instruction to be fetched. During normal instruction processing, the program counter register may be incremented to cause sequential instructions to be fetched. Alternatively, the program counter value may be altered by loading a new value into it via the bus 150. The new value may be derived based on decoding and executing a flow control instruction such as, for example, a branch instruction. In addition, the loop control portion of the program counter and loop control unit 135 may be used to provide repeat instruction processing and repeat loop control as further described below.

The instruction execution units 115 receive the decoded instructions from the instruction fetch/decode unit 110 and thereafter execute the decoded instructions. As part of this process, the execution units may retrieve one or two operands via the bus 150 and store the result into a register or memory location within the data memory 120. The execution units may include an arithmetic logic unit (ALU) such as those typically found in a microcontroller. The execution units may also include a digital signal processing engine, a floating point processor, an integer processor or any other convenient execution unit. A preferred embodiment of the execution units and their interaction with the bus 150, which may include one or more buses, is presented in more detail below with reference to FIG. 2.

The data memory and registers 120 are volatile memory and are used to store data used and generated by the execution units. The data memory 120 and program memory 105 are preferably separate memories for storing data and program instructions respectively. This format is a known generally as a Harvard architecture. It is noted, however, that according to the present invention, the architecture may be a Von-Neuman architecture or a modified Harvard architecture which permits the use of some program space for data space. A dotted line is shown, for example, connecting the program memory 105 to the bus 150. This path may include logic for aligning data reads from program space such as, for example, during table reads from program space to data memory 120.

Referring again to FIG. 1, a plurality of peripherals 125 on the processor may be coupled to the bus 150. The peripherals may include, for example, analog to digital converters, timers, bus interfaces and protocols such as, for example, the controller area network (CAN) protocol or the Universal Serial Bus (USB) protocol and other peripherals. The peripherals exchange data over the bus 150 with the other units.

The data I/O unit 130 may include transceivers and other logic for interfacing with the external devices/systems 140. The data I/O unit 130 may further include functionality to permit in circuit serial programming of the Program memory through the data I/O unit 130.

FIG. 2 depicts a functional block diagram of a data busing scheme for use in a processor 100, such as that shown in FIG. 1, which has an integrated microcontroller arithmetic logic unit (ALU) 270 and a digital signal processing (DSP) engine 230. This configuration may be used to integrate DSP functionality to an existing microcontroller core. Referring to FIG. 2, the data memory 120 of FIG. 1 is implemented as two separate memories: an X-memory 210 and a Y-memory 220, each being respectively addressable by an X-address generator 250 and a Y-address generator 260. The X-address generator may also permit addressing the Y-memory space thus making the data space appear like a single contiguous memory space when addressed from the X address generator. The bus 150 may be implemented as two buses, one for each of the X and Y memory, to permit simultaneous fetching of data from the X and Y memories.

The W registers 240 are general purpose address and/or data registers. The DSP engine 230 is coupled to both the X and Y memory buses and to the W registers 240. The DSP engine 230 may simultaneously fetch data from each the X and Y memory, execute instructions which operate on the simultaneously fetched data and write the result to an accumulator (not shown) and write a prior result to X or Y memory or to the W registers 240 within a single processor cycle.

In one embodiment, the ALU 270 may be coupled only to the X memory bus and may only fetch data from the X bus. However, the X and Y memories 210 and 220 may be addressed as a single memory space by the X address generator in order to make the data memory segregation transparent to the ALU 270. The memory locations within the X and Y memories may be addressed by values stored in the W registers 240.

Any processor clocking scheme may be implemented for fetching and executing instructions. A specific example follows, however, to illustrate an embodiment of the present invention. Each instruction cycle is comprised of four Q clock cycles Q1–Q4. The four phase Q cycles provide timing signals to coordinate the decode, read, process data and write data portions of each instruction cycle.

According to one embodiment of the processor 100, the processor 100 concurrently performs two operations—it fetches the next instruction and executes the present instruction. Accordingly, the two processes occur simultaneously. The following sequence of events may comprise, for example, the fetch instruction cycle:

Q1: Fetch Instruction
Q2: Fetch Instruction
Q3: Fetch Instruction
Q4: Latch Instruction into prefetch register, Increment PC The following sequence of events may comprise, for example, the execute instruction cycle for a single operand instruction:

Q1: latch instruction into IR, decode and determine addresses of operand data
Q2: fetch operand
Q3: execute function specified by instruction and calculate destination address for data
Q4: write result to destination The following sequence of events may comprise, for example, the execute instruction cycle for a dual operand instruction using a data pre-fetch mechanism. These instructions pre-fetch the dual operands simultaneously from the X and Y data memories and store them into registers specified in the instruction. They simultaneously allow instruction execution on the operands fetched during the previous cycle.

Figure 3A:
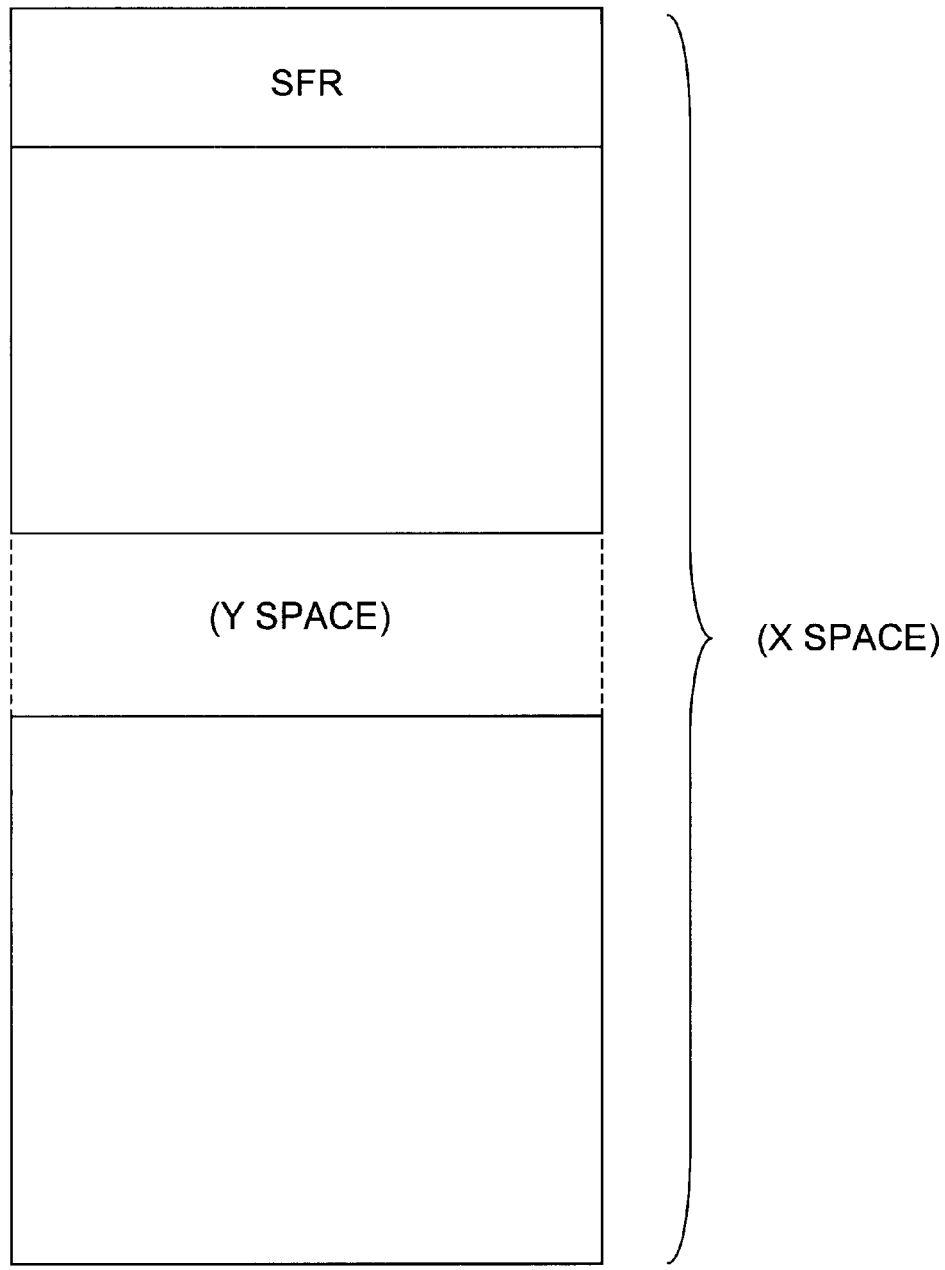
FIG. 3A depicts a diagram of the memory space in a linear address mode according to an embodiment of the present invention.
Figure 3B:
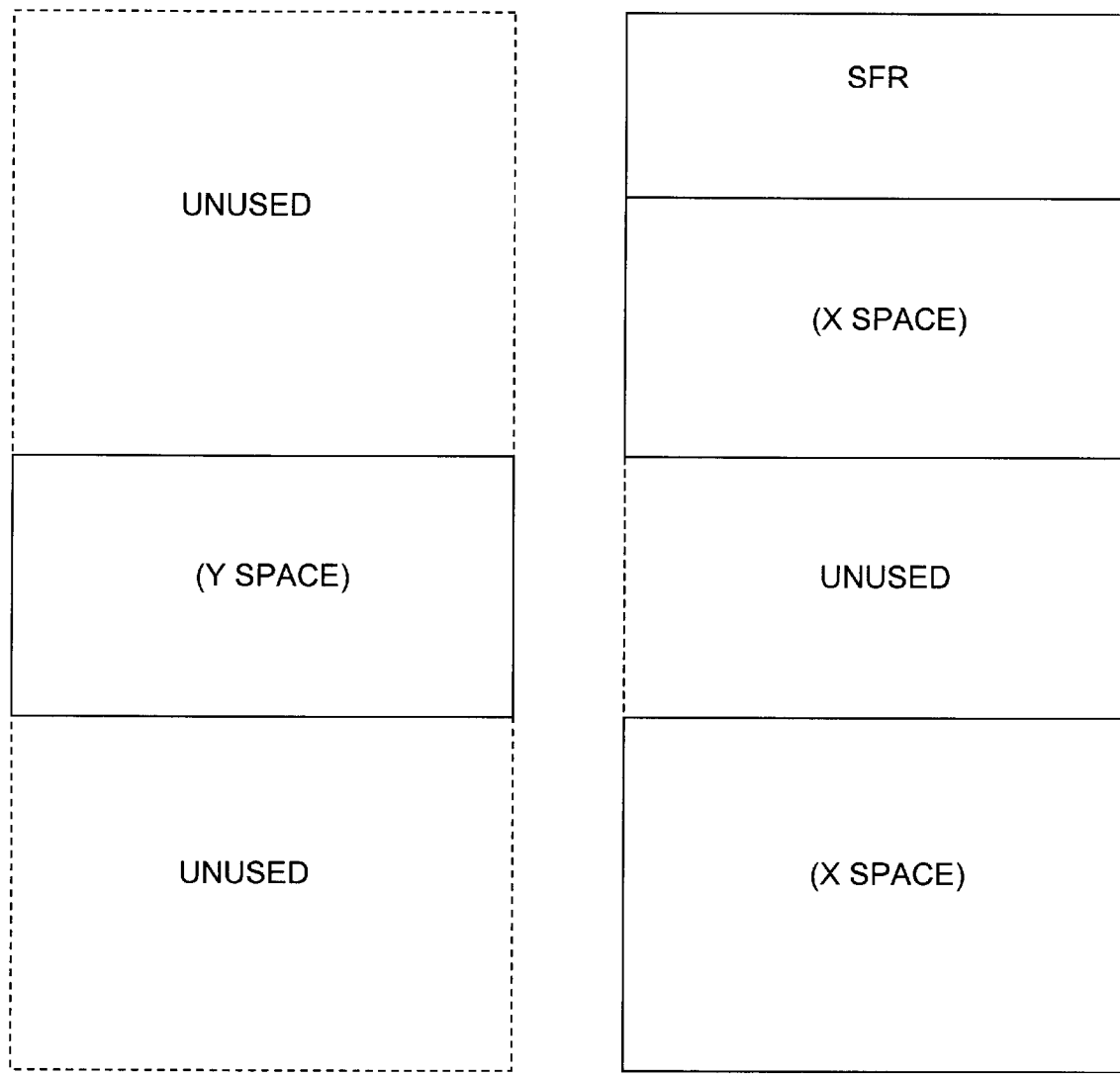
FIG. 3B depicts a diagram of the memory space in a dual address mode according to an embodiment of the present invention.

Q1: latch instruction into instruction register, decode and determine addresses of operand data
Q2: pre-fetch operands into specified registers, execute operation in instruction
Q3: execute operation in instruction, calculate destination address for data
Q4: complete execution, write result to destination Dynamically Reconfigurable Memory FIGS. 3A and 3B depict an organization of the data memory 120 according to an embodiment of the present invention. Referring to FIG. 3A, the data memory 120 may be organized as a contiguous memory that includes an X space portion and a Y space portion. When the processor is processing a non-DSP engine instruction, only the X address generator 250 is active. In this mode, the entire memory may be accessed using the X address generator. Accordingly, data may be read from the entire memory and written into the entire memory 120, including the Y space portion thereof, using the X address generator. This permits the data memory 120 to be accessed as a linear address space during non-DSP engine instruction processing.

During DSP engine processing, the data memory 120 is defined to have separate X and Y spaces. The X and Y space are separately addressable by the X address generator and the Y address generator. The X address generator generates addresses for the X portion of the data memory and the Y address generator only generates addresses for the Y portion of the data memory. In this mode, the X and Y spaces may each be less than the entire memory and in a preferred embodiment the X space includes portions above and below the Y space portion.

The instruction decoder generates control signals, based on the decoded instruction which determine the addressing mode, for activating the X address generator 250 and the Y address generator 260. When the instruction decoder decodes a non-DSP engine instruction, the instruction decoder generates control signals which disable the Y-address generator 260 and the Y-data bus. The instruction decoder also generates control signals that allow any of the registers 240 to include a pointer value to any location within the data memory 120. Accordingly, instruction processing may entail addressing the data memory as a linear address space via the X address generator to a) fetch operands from the memory 120, b) execute the instruction on the operands and c) store back the result into the data memory over the X-data bus into a memory location specified to the X address generator 250.

When the instruction decoder decodes a DSP engine instruction, the instruction decoder generates control signals which enable the Y-address generator 260 and the Y-data bus. In addition, the instruction decoder may configure the X-address generator 250 and the Y-address generator 260 to only accept indirect addresses from certain registers within the W array 240. For example, in a preferred embodiment, the X-address generator and the Y-address generator are each configured to only process indirect addresses from a respective four of the W-registers 240 with two being different for X address generation and 2 different ones being for Y address generation. However, any number of registers may be allocated for these purposes.

During execution of a DSP instruction, the instruction decoder decodes the DSP engine instruction and causes the DSP engine to fetch and process two operands simultaneously from the data memory 120. One of the operands is fetched from the Y-data space over the Y-data bus based on a pointer address specified in one of two of the designated W registers 240 and decoded by the Y address generator. The other operand is fetched from the X-data space over the X-data bus based on a pointer address specified in one of the designated W registers 240 and decoded by the X address generator. The X and Y spaces may be non-overlapping and contiguous. Alternatively, the X and Y spaces may be overlapping.

Figure 4:
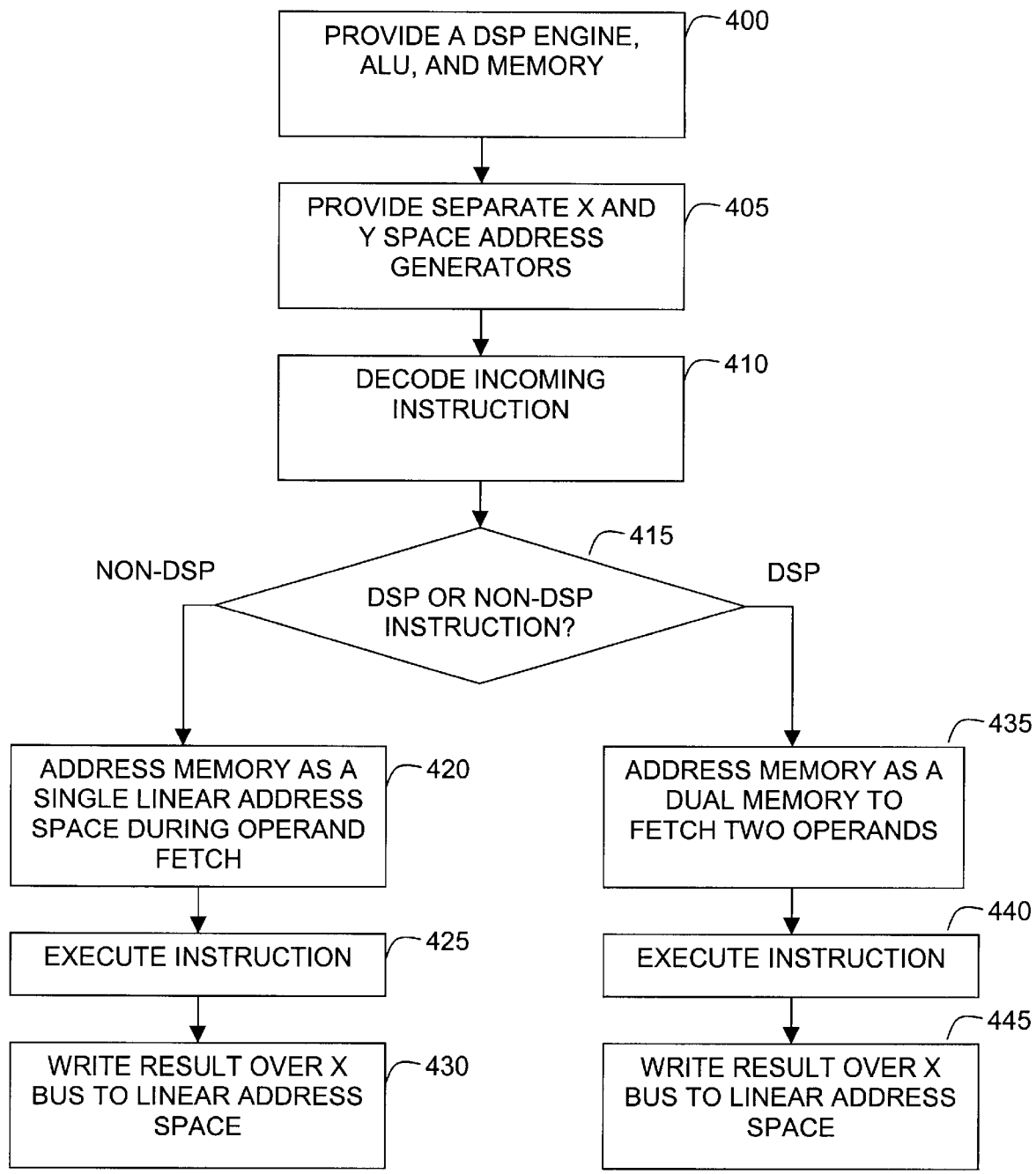
FIG. 4 depicts a method of dynamically reconfiguring a memory to permit addressing the memory as a dual memory or as a memory with a single linear address space according to an embodiment of the present invention.

FIG. 4 depicts a method of dynamically reconfiguring a memory to permit addressing the memory as a dual memory or as a memory with a single linear address space according to an embodiment of the present invention. Referring to FIG. 4, in step 400, a DSP engine, an arithmetic logic unit (ALU) and a memory are provided on a processor. This configuration may permit the processor to process DSP instructions in addition to microcontroller or microprocessor instructions and may further permit the melding of two instructions sets or an expanded instruction set within the same processor.

In step 405, separate X and Y space address generators are provided for addressing portions of the memory as two separate X and Y memory spaces in one mode and for addressing the entire memory as a single linear address space using the X address generator in another mode.

The X and Y address generators may be configured at the time of manufacturing the processor to set the portions addressable by the X and Y address generators in the dual memory space mode. Alternatively, the X and Y address generators may each permit access to all of the memory space with the users enforcing discipline to maintain the memory spaces as non-overlapping or otherwise to include mechanisms to prevent address conflicts between the X and Y memory spaces.

In step 410, the processor decodes an incoming instruction. Then in step 415 an instruction decoder determines whether the instruction is a DSP instruction or a non-DSP instruction in order to determine whether to use the dual memory space mode or the linear memory space mode. The decision may be made based on the opcode of the instruction being present in a look up table, being within a predetermined range or otherwise meeting a predetermined criteria for dual memory space mode.

If in step 415 the instruction meets the predetermined criteria for dual memory space mode, then step 435 begins.

In step 435, the processor addresses the data memory as a dual memory to concurrently fetch two operands. Then in step 440, the processor executes the instruction. As an example, the instruction may be a multiply and accumulate instruction which multiplies the two operands that were concurrently fetched and produces a result. Then in step 445, the processor writes the result back to the data memory over the X bus.

If in step 415 the instruction does not meet the predetermined criteria for dual memory space mode, then step 420 begins. In step 420, the processor addresses the memory as a single linear address space during operand fetch and fetches at most a single operand. In step 425, the processor executes the instruction on the operand fetched from memory or the registers or on the operands fetched from the registers. Then in step 430, the processor writes the result of the instruction over the X bus to the data memory using the X address generator to address the memory as a linear address space.

Figure 5:
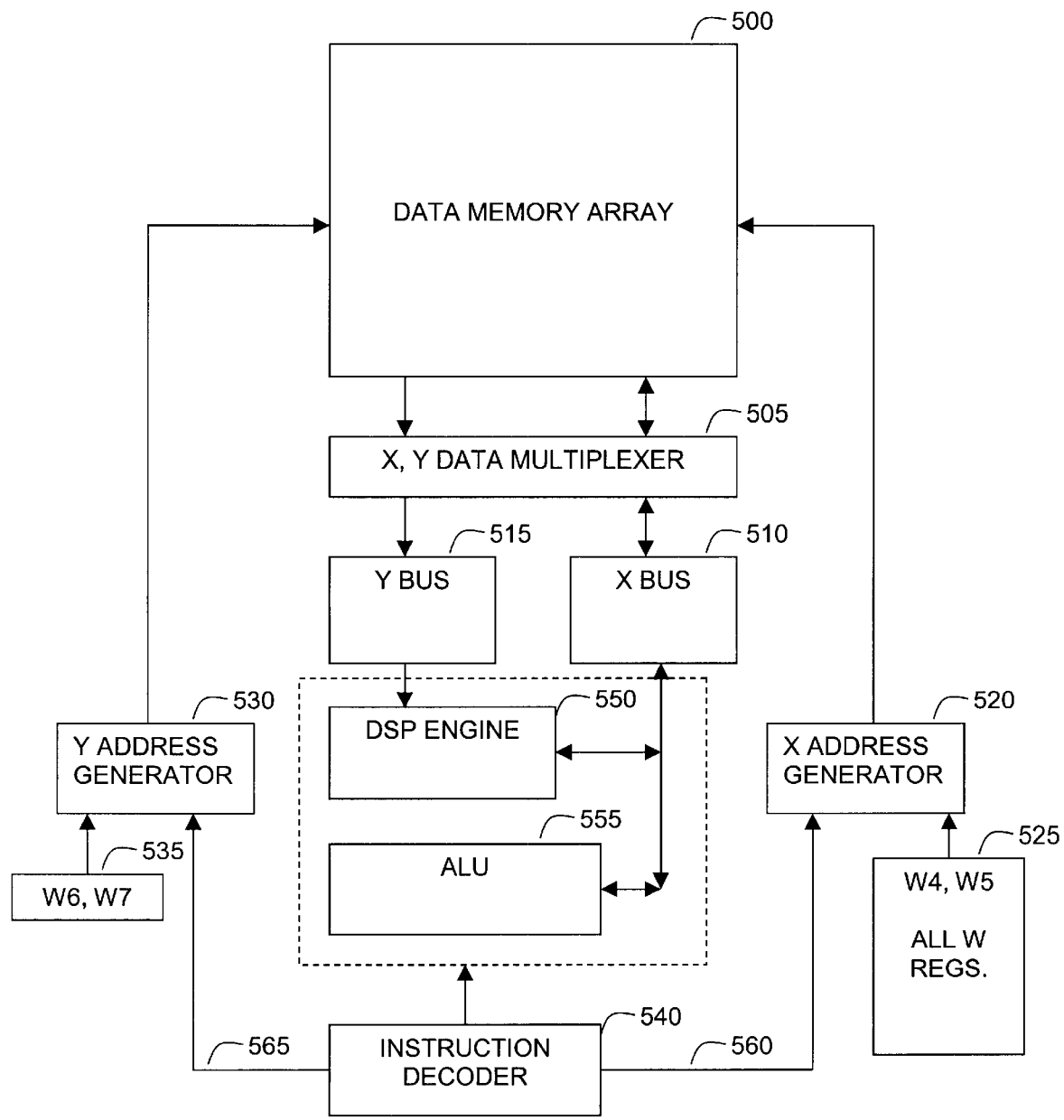
FIG. 5 depicts a simplified view of the processor to depict an interaction between instruction decoding logic and the address generators to illustrate single and dual memory space addressing modes according to an embodiment of the present invention.

FIG. 5 depicts a simplified view of the processor to depict an interaction between instruction decoding logic and the address generators to illustrate single and dual memory space addressing modes according to an embodiment of the present invention. Referring to FIG. 5, a data memory array 500 is coupled to a X, Y data multiplexer 505 which affords read and write access to memory locations within the memory array 500. The memory array may include dual bit lines for permitting simultaneous reads from two memory locations in the same active word column over the X and Y buses 510 and 515, respectively. Alternatively, the memory array and X and Y addressing schemes may be organized to provide simultaneous reading from any memory location within the memory array via the X and Y data buses. The X and Y data multiplexer may also be configured to allow only reading from the Y data bus and reading and writing from the X data bus.

The X and Y data buses are coupled to the DSP engine 550 to permit concurrent fetching of operands from the X and Y memory spaces. The DSP engine may be configured to provide result output only over the X bus for writing back to the memory array 500. The ALU 555 may be coupled to the X data bus 510 to permit reading and writing only over the X data bus.

The instruction decoder 540 decodes instructions retrieved from program memory (not shown). The instruction decoder 540 may include determining logic for determining whether the operation code (op code) of the instruction meets a predetermined criteria for treating the memory array 500 as a dual space memory. The logic may include logic for comparing all or portions of the op code (or other portions of the instruction) with values in a look up table or a predetermined range of values. Alternatively, the logic may check for the presence or absence of certain values within bit fields of the instruction. Based on the determination made by the determining logic, the instruction decoder 540 sends control signals over lines 560 and 565 respectively to the X and Y address generators.

The X address generator is coupled to the control signal line 560 from the instruction decoder and to the registers 525. When the instruction is determined to not be an instruction that requires dual operand fetch (or to be an instruction that requires a single memory space for operand fetch), a toggle signal and an address of one of the registers 525 may be sent over the line 560 to the X address generator 520. The toggle signal sets the X address generator 520 to address the memory array 500 as a single linear address space. The register address sent over the control lines 560 is used to select one of the registers 525 to supply a pointer value for determining a memory location within the memory array 500.

When the instruction is determined to be an instruction that requires dual operand fetch from dual address spaces, the toggle signal sent over the control lines 560 sets the X address generator 520 to address only the portions of the memory array 500 that are assigned to X memory space. Moreover, logic within the X address generator 520 may restrict the number of registers within the registers 520 from which the X address generator may pull values for addressing the memory array 500. In the example shown, the X address generator is limited to pulling values from registers W4 and W5 for X address generation during dual memory space mode. The control signals 560 further include values identifying which registers W4 or W5 to use for pointing to the required memory location within the X memory space of the memory array 500.

The Y address generator is coupled to the control signal lines 565 from the instruction decoder and may be coupled to all or only a portion of the registers 525. FIG. 5 shows an illustrative example in which the Y address generator 530 is coupled to only a portion of the registers (W6 and W7) which are labeled 535. When the instruction is determined to not be an instruction that requires dual operand fetch (or to be an instruction that requires a single memory space for operand fetch), a toggle signal may be sent over the line 565 to the Y address generator 530. The toggle signal sets the Y address generator 530 to disable memory addressing.

When the instruction is determined to be an instruction that requires dual operand fetch from dual address spaces, the toggle signal sent over the control lines 565 sets the Y address generator 530 to address only the portions of the memory array 500 that are assigned to Y memory space. Moreover, logic within the Y address generator 530 may restrict the number of registers within the registers 525 to the registers 535 from which the Y address generator may pull values for addressing the memory array 500. The control signals 565 further include values identifying which registers W6 or W7 to use for pointing to the required memory location within the Y memory space of the memory array 500.

While particular embodiments of the present invention have been illustrated and described, it will be understood by those having ordinary skill in the art that changes may be made to those embodiments without departing from the spirit and scope of the invention. For example, it will be understood that operands may be written concurrently over both the X and Y buses back to the X and Y portions of the data memory. It will also be understood that while DSP instructions have been illustrated as being capable of dual operand memory operation and non-DSP instruction have been illustrated as not being capable of dual operand memory operation, this limitation is for illustration purposes only. Other instruction classes, including non-DSP instruction classes, and individual instructions regardless of their "class" may also be capable of dual operand processing from the memory.

What is claimed is:

1. A method of providing linear and dual address spaces within a memory, comprising:
   providing a digital signal processor (DSP) engine, an arithmetic logic unit (ALU) and a memory;
   providing separate X and Y address generation units for generating addresses to the memory,
   the X address generation unit being configured to generate addresses to all of the memory space when processing a non-digital signal processor (DSP) engine instruction and to a first portion of the memory when processing a DSP engine instruction;
   the Y address generation unit being configured to generate addresses to a second portion of the memory space when processing a DSP engine instruction and to none of the memory space when processing a non-digital signal processor (DSP) engine instruction; and
   providing an instruction decoder for decoding instructions, the instruction decoder activating the X address generation unit for ALU instructions and the instruction decoder activating the X and Y address generation units for DSP engine instructions.

2. The method according to claim 1, wherein the first and second portion are non-overlapping.

3. The method according to claim 2, wherein the first and second portion are contiguous.

4. The method according to claim 1, wherein the first portion includes a portion above the second portion and a portion below the second portion.

5. The method according to claim 1, further comprising:
   providing separate X and Y data buses,
      the X data bus being coupled to the memory permitting reading and writing to and from the entire memory, and
      the Y data bus being coupled to the second portion of the memory permitting only reading from the second portion.

6. The method according to claim 5, further comprising:
   reading X and Y operands concurrently from the respective first and second portions of the memory over the X and Y data buses based on the instruction decoder decoding a DSP instruction requiring a dual operand fetch.

7. The method according to claim 6, further comprising:
   executing the DSP instruction to calculate a result based on the X and Y operands; and
   writing the result back to the first portion of the memory over the X bus.

8. A processor for addressing a memory as a signal and dual space memory based on an addressing mode, comprising:
   a data memory having X and Y memory spaces;
   an instruction decoder for determining whether an instruction requires single or dual memory space operation; and
   X and Y address generators coupled to the instruction decoder, the data memory activating the X and Y address generators based on the instruction decoder determining dual memory space operation is required and activating the X address generator only based on the instruction decoder determining single memory space operation is required.

9. The processor according to claim 8, further comprising:
   registers coupled to the X and Y address generators for storing pointers to the memory.

10. The processor according to claim 9, wherein for a dual memory space operation, a subset of the registers stores pointers to the Y space within the memory.

11. The processor according to claim 10, wherein for a dual memory space operation, a subset of the registers stores pointers to the X space within the memory.

12. The processor according to claim 11, wherein for a single memory space operation, any of the registers stores pointers to the memory.

13. The processor according to claim 9, further comprising:
X and Y data buses coupled to the memory for retrieving operands from the X and Y memory spaces in a dual memory space operation and for retrieving operands from the memory over the X data bus in a single memory space operation.

14. The processor according to claim 10, further comprising:
a DSP engine having operand inputs coupled to the X and Y data buses and having a result output coupled only to the X data bus.

15. The processor according to claim 9, further comprising:
an arithmetic unit coupled to the X data buses for operand and result input and output.

* * * * *